(12) United States Patent
Wexler

(10) Patent No.: US 11,675,435 B2
(45) Date of Patent: Jun. 13, 2023

(54) ELECTRONIC BODY PERCUSSION

(71) Applicant: David Wexler, London (GB)

(72) Inventor: David Wexler, London (GB)

( * ) Notice: Subject to any disclaimer, the term of this patent is extended or adjusted under 35 U.S.C. 154(b) by 262 days.

(21) Appl. No.: 16/755,151

(22) PCT Filed: Oct. 11, 2018

(86) PCT No.: PCT/GB2018/052917
§ 371 (c)(1),
(2) Date: Apr. 9, 2020

(87) PCT Pub. No.: WO2019/073241
PCT Pub. Date: Apr. 18, 2019

(65) Prior Publication Data
US 2020/0241640 A1 Jul. 30, 2020

(30) Foreign Application Priority Data
Oct. 12, 2017 (GB) ...................................... 1716765

(51) Int. Cl.
*G06F 3/01* (2006.01)
*H04W 4/80* (2018.01)

(52) U.S. Cl.
CPC .............. *G06F 3/014* (2013.01); *G06F 3/017* (2013.01); *H04W 4/80* (2018.02)

(58) Field of Classification Search
CPC .................... G06F 3/014; G06F 3/017; G10H 2220/326; G10H 1/0008; G10D 13/00
See application file for complete search history.

(56) References Cited

U.S. PATENT DOCUMENTS

| | | | |
|---|---|---|---|
| 6,154,199 A | 11/2000 | Butler | |
| 2003/0026170 A1* | 2/2003 | Yang | G04C 3/005 368/10 |
| 2010/0156783 A1 | 6/2010 | Bajramovic | |
| 2016/0225357 A1 | 8/2016 | Black et al. | |

FOREIGN PATENT DOCUMENTS

| | | |
|---|---|---|
| WO | 2016206117 A1 | 12/2016 |
| WO | 2017060900 A1 | 4/2017 |

* cited by examiner

*Primary Examiner* — Phuong H Nguyen
(74) *Attorney, Agent, or Firm* — Idea Intellectual Limited; Margaret A. Burke; Sam T. Yip

(57) ABSTRACT

Apparatus for an electronic percussion system is provided, comprising: a plurality of sensors (12, 14, 16, 18); attaching means (10) for attaching the sensors to the hand and locating the sensors each at a respective predetermined location thereon, wherein each of the sensors is configured to send information for receipt by a determining means in response to impact of the sensor on a contact surface, wherein the attaching means and the sensors are together configured so that such information enables the determining means to distinguish each of the gestures from each other of the gestures. Each predetermined gesture is mapped to a respective sample, and performing of the gesture causes playing of the respective sample. The gestures may include a finger clicking action, a chest slap and a hand clap. There is also provided a related method of determining a percussion gesture.

20 Claims, 6 Drawing Sheets

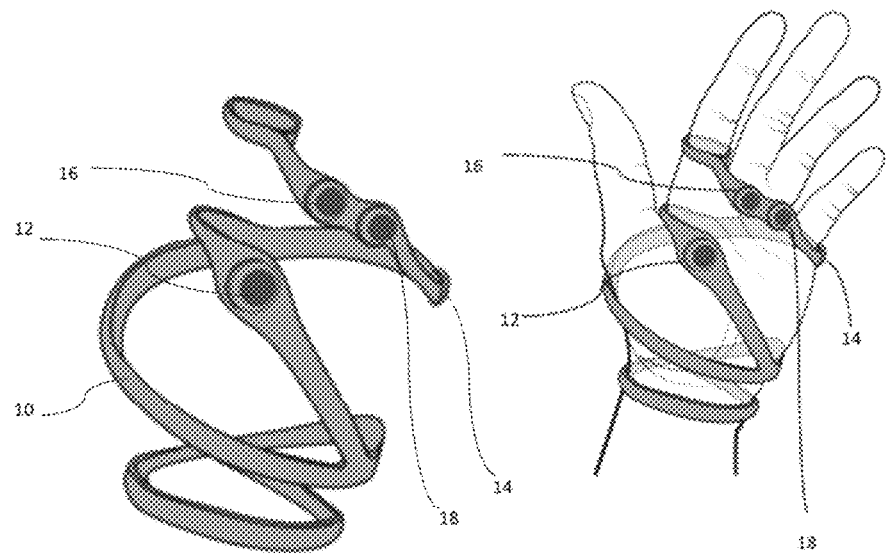
Fig. 1A
Fig. 1B
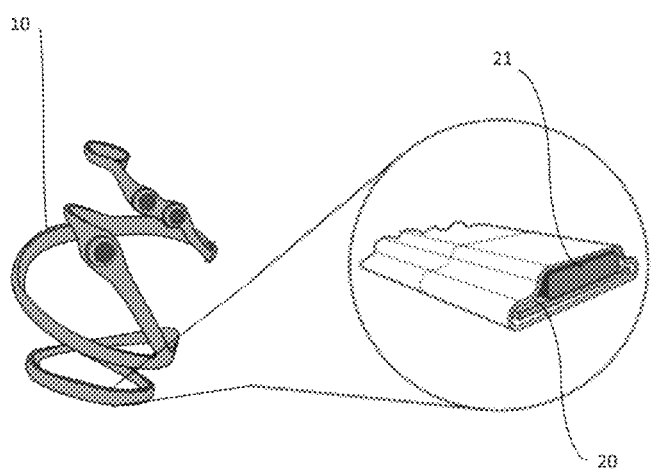
Fig. 1C

| Gesture identifier | Primary parameter 1st sensor (thumb sensor) | Primary parameter 2nd sensor (bottom side first sensor) | Primary parameter 3rd sensor (middle finger callus sensor) | Primary parameter 4th sensor (ring finger callus sensor) | Secondary parameter IMU (x, y, z) LEFT HAND |
|---|---|---|---|---|---|
| Gesture 1 (CHEST) | Y | Y/N | Y | Y | -30, +90, -90 |
| Gesture 2 (CLAP) | N | Y/N | Y | Y | -60, +20, -180 |
| Gesture 3 (CLICK) | Y | N | Y/N | N | -60, +20, -180 |
| Gesture 4 (THUMP) | N | Y | N | Y/N | 0, 0, -90 |

*Fig. 3*

| Gesture identifier | Audio sample |
|---|---|
| Gesture 1 | Sample A |
| Gesture 2 | Sample B |
| Gesture 3 | Sample C |
| Gesture 4 | Sample D |

*Fig. 4*

ELECTRONIC BODY PERCUSSION

FIELD OF THE INVENTION

The invention relates to apparatus for an electronic percussion system. The invention also relates to a related method.

BACKGROUND

Body percussion is popular and involves musicians making various gestures involving impact, particularly on parts of the body, to generate different sounds. For example, a musician may finger click, thump, chest slap and hand clap to generate different sounds.

Attempts have been made to create wearable electronic musical instruments. In particular, attempts have been made to put sensors onto fingers, so that a user can create sounds using similar actions to those used to play a piano. Also, a known patent document, U.S. Pat. No. 8,362,350B2, discloses a percussion sensor mountable on a palm of a hand, which can be used to generate a signal when a surface is struck by an open, flat hand.

There is however no known wearable electronic instrument with which a user can perform different body percussion gestures, such as finger clicks, thumps, claps, chest slaps, that can distinguish one type of gesture from another. It is an object of the present invention to address a problem of distinguishing different gestures, particularly different body percussion gestures.

SUMMARY OF THE INVENTION

According to a first aspect of the present invention, there is provided apparatus for an electronic percussion system, comprising: a plurality of sensors; and attaching means for attaching the sensors to the hand and locating the sensors each at a respective predetermined location thereon. Each of the sensors is configured to send information for receipt by a determining means in response to impact of the sensor on a contact surface. The attaching means and the sensors are together configured so that such information enables the determining means to distinguish each of the gestures from each other of the gestures.

Such gestures may include any one, more of all of: a finger clicking action; a thumping action; a chest slap; and a hand clap.

The attaching means may be configured to locate a first of the sensors at a portion of a palm of the hand at which a middle finger impacts in a finger clicking action, wherein the first sensor is configured to provide a signal in response to a finger clicking action.

The attaching means may be configured to locate a second of the sensors on a bottom side of a hand, for detecting a thumping action.

The attaching means may be configured to locate at least one further of the sensors at a portion of a palm of the hand, that is, below fingers of the hand. For example, the portion may be the upper portion of the palm.

The second sensor and the at least one further sensor may be configured for use in detecting a chest slap action.

The at least one further of the sensors may comprise a third sensor. In this case the attaching means may be configured to locate the third sensor on an upper portion of a palm of the hand, below a middle finger.

The at least one further of the sensors may comprise a fourth sensor. In this case the attaching means is configured to locate the fourth sensor on an upper portion of a palm of the hand, below a ring finger.

The predetermined locations may be at non-finger parts of the hand.

The attaching means may comprise a support wearable on the hand. In this case each of the sensors is mounted on the support, and the support is configured to locate and retain the sensors at predetermined locations on the hand.

Any one, more or all of the sensors may be contact microphone sensors or pressure sensors.

The apparatus may further comprise a movement sensing means. In this case the attaching means is preferably configured to attach the movement sensing means in a fixed disposition relative to a wrist of the user. The movement sensing means may be configured to generate movement information in response to angular movement of the wrist relative to a predetermined initial position. The determining means may be configured to receive the movement information, and to determine that the gesture has been performed also based on the movement information.

The movement information may be indicative of angular movement of the wrist about each of three mutually perpendicular axes.

The apparatus may further comprise: receiving means for receiving information from each of the sensors indicating that the respective sensor has hit a contact surface; and determining means for determining that one of the predetermined gestures has been performed based at least on the received information.

The determining means may be configured to determine a gesture identifier corresponding to the performed gesture using a first mapping table that maps information received from the sensors to predetermined gestures.

The receiving means may be mounted on the attaching means and the determining means may be at least partially mounted on the attaching means.

The determining means may be further configured to: determine a sample from a plurality of samples based on the determined gesture identifier using a second mapping table; and cause playing of the determined sample.

The apparatus may further comprise: communications means mounted on the attaching means, computer means spaced away from and not mounted on the attaching means, wherein the determining means comprises: first determining means mounted on the attaching means and operatively coupled to the communications means; second determining means, wherein the computer means comprises the second determining means, wherein the first determining means is further configured to cause the communications means to send the gesture identifier to the computer means, and wherein the second determining means is configured to determine and cause playing of the sample.

The received information may indicate a speed with which each sensor hit the contact surface, wherein each sensor is only considered as triggered if the speed is greater than a threshold speed.

According to a second aspect of the present invention, there is provided a method of determining a percussion gesture, comprising: receiving, at a control means, information from at least one of a plurality of sensors indicating at least that the respective sensor has hit a contact surface, wherein the sensors are each located at a predetermined location on a non-finger part of a hand; determining that one of a plurality of predetermined gestures has been performed, based on the received information.

Such gestures may include at least one of: a finger clicking action and a thumping action. Such gestures may include a chest slap and/or a hand clap.

A first of the sensors may be located at a portion of a palm of the hand at which a middle finger impacts in a finger clicking action. In this case the first sensor is configured to provide a signal in response to such a clicking action.

A second of the sensors may be located on a bottom side of a hand, for detecting a thumping action. Additionally or alternatively, at least one further of the sensors may be located at a portion of a palm of the hand, for example an upper portion below fingers of the hand, other than where the middle finger impacts in the finger clicking action.

The second sensor and the at least one further sensor may be configured for use in detecting a chest slap action.

The at least one further of the sensors may comprise a third sensor, wherein the third sensor is located on a portion of a palm of the hand, for example an upper portion below a middle finger.

The at least one further of the sensors may comprise a fourth sensor, wherein the fourth sensor is located on a portion of a palm of the hand, for example an upper portion below a ring finger.

The attaching means may comprise a support wearable on the hand. Each of the sensors may be mounted on the support, and the support may be configured to locate and retain the sensors at predetermined locations on the hand. Any one, more or all of the sensors may be contact microphone sensors or pressure sensors.

The method may further comprise a movement sensing mean attached to the hand, wherein the movement sensing means is configured to generate angular movement information in response to angular movement of a user's wrist, wherein the control means is configured to receive the movement information, and to also determine that the gesture has been performed based on the movement information.

The movement information may be indicative of angular movement of the hand relative to each of three mutually perpendicular axes.

The method may further comprise: means for receiving information from each of the sensors indicating that the respective sensor has hit a contact surface; determine that a predetermined gesture has been performed based on the received information.

The receiving means and the determining means may be mounted on the attaching means. The method may further comprise: determining a sample from a plurality of samples based on the determined gesture; causing playing of the determined sample.

The received information may indicate a speed with which each sensor hit the contact surface. Each sensor may only considered as triggered if the speed is greater than a threshold speed.

According to a third aspect, there is provided a method comprising: receiving one or more sets of movement values from movement sensing means mounted on a limb, for example a hand or wrist, of a user, for the or each performance of a particular gesture by the user, where each movement value in each set is for a respective one of a plurality of predetermined parameters; and storing the values for the gesture in association with a gesture identifier, wherein the values enable the gesture to be distinguished from other gestures. The movement values may be indicative of angular movement of the wrist about each of three mutually perpendicular axes.

The method may further comprise defining a range for each movement value and storing each range in association with the gesture identifier, such that the gesture, when performed, can be distinguished from other gestures. The range may be based on a plurality of received sets for the gesture. Thus, a new gesture, distinguishable from other gestures, can be defined. The movement values in the set may also include values from one or more sensors located on a palm or fingers, which trigger on impact or pressure on the or each sensor, for example by a gesture including hitting a surface (e.g. a body part) or in a squeezing action. The movement value produced by the or each sensor may be indicative of speed of impact or force of pressure. There may also be provided apparatus comprising a device and a computer means configured to provide such a method.

BRIEF DESCRIPTION OF THE FIGURES

For better understanding of the present invention, embodiments will now be described, by example of only, with reference to the accompanying Figures in which:

FIG. 1A is an illustrative perspective view of a device in accordance with an embodiment, for wearing on a left hand;

FIG. 1B is an illustrative perspective view of the device worn on a left hand;

FIG. 1C is an illustrative perspective view of the device including an enlarged view of the cross-section;

FIG. 3 is a table from which a gesture identifier can be determined based on received signals;

FIG. 4 is a table in which gesture identifiers and samples are mapped;

DETAILS DESCRIPTION OF EMBODIMENTS

Figure 1D:
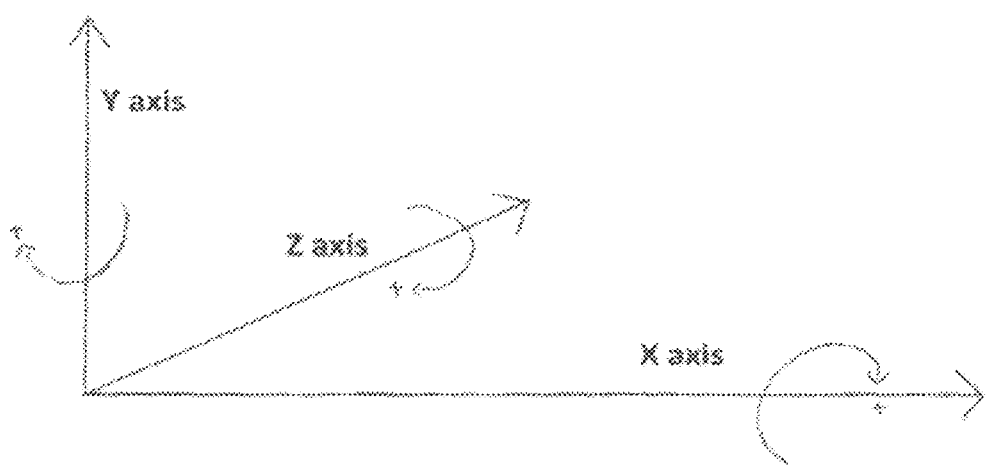
FIG. 1D indicates axes used in referencing angular coordinates.

Likes reference numerals are herein used to denote like parts. Reference is made below to a hand of a user and various parts of the hand are referred to. A palm is referred to as being "below" fingers. An "upper" portion of the palm means the portion immediately beneath the fingers.

Embodiments of the invention relate to a device for attaching to a user's hand, and a computing device forming an electronic percussion system. Referring to FIGS. 1A and 1B, the device comprises a support structure 10 for wearing on a left hand. The support structure 10 comprises a strap that can be flexed to allow a user to locate the support structure 10 over the hand as indicated in FIG. 1B. The support structure 10 includes a looped portion through which an index finger of the hand extends. The support structure 10 comprises a soft silicone material. Alternatively, the support structure 10 may comprise a soft, flexible and non-frangible elastomer.

The support structure has four sensors 12, 14, 16, 18 mounted on it. The sensors 12, 14, 16, 18 are located to allow at least the following gestures to be distinguished:
   (a) a finger click action;
   (b) a thump on a horizontal contact surface, such as a table top, with a closed fist;
   (c) a clap of the hands;
   (d) a chest slap.

A first of the sensors is a thumb palm sensor 12, which locates over the thenar eminence. This sensor is located to trigger when the user performs the finger click action and a chest slap.

A second is a bottom side first sensor 14. This bottom side first sensor 14 is located to trigger when the user performs a thump on a horizontal surface. The sensor is located at a side of the hand, at a joint between the metacarpal of the little finger and phalanges of the little finger. In a variant embodiment, the support structure 10 may be modified so that the sensor 14 is located on a side of the hand, over the hypothenar eminence.

A third of the sensors is a middle finger callus sensor 16. This sensor 16 locates on a palm adjacent where a metacarpal of the middle finger joins a phalange of the middle finger, where there is typically a callus below the middle finger.

A fourth of the sensors is a ring finger callus sensor 18. This sensor 18 locates on a palm adjacent where a metacarpal of the ring finger joins a phalange of the ring finger, where there is typically a callus below the ring finger.

This middle finger callus sensor 16 and the ring finger callus sensor 18 are located to trigger when the user claps hands, or slaps his/her chest.

The first, second, third and fourth sensors 12, 14, 16, 18 are each a microphone sensor configured to sense audio vibrations. Alternatively, one, more or all of the first, second, third and fourth sensors 12, 14, 16, 18 are pressure sensors, configured to sense impact speed through contact with solid objects. Each of the first, second, third and fourth sensors 12, 14, 16, 18 is configured to produce a signal indicating a speed at which the respective sensor has struck a contact surface.

The control unit 20 in the form of a flexible PCB is located within the material of the support structure 10. The control unit 20 includes a battery 21, also located within the material of the support structure 10, for powering the control unit 20. Alternatively, the control unit 20 may be attached onto the support structure 10.

Figure 2:
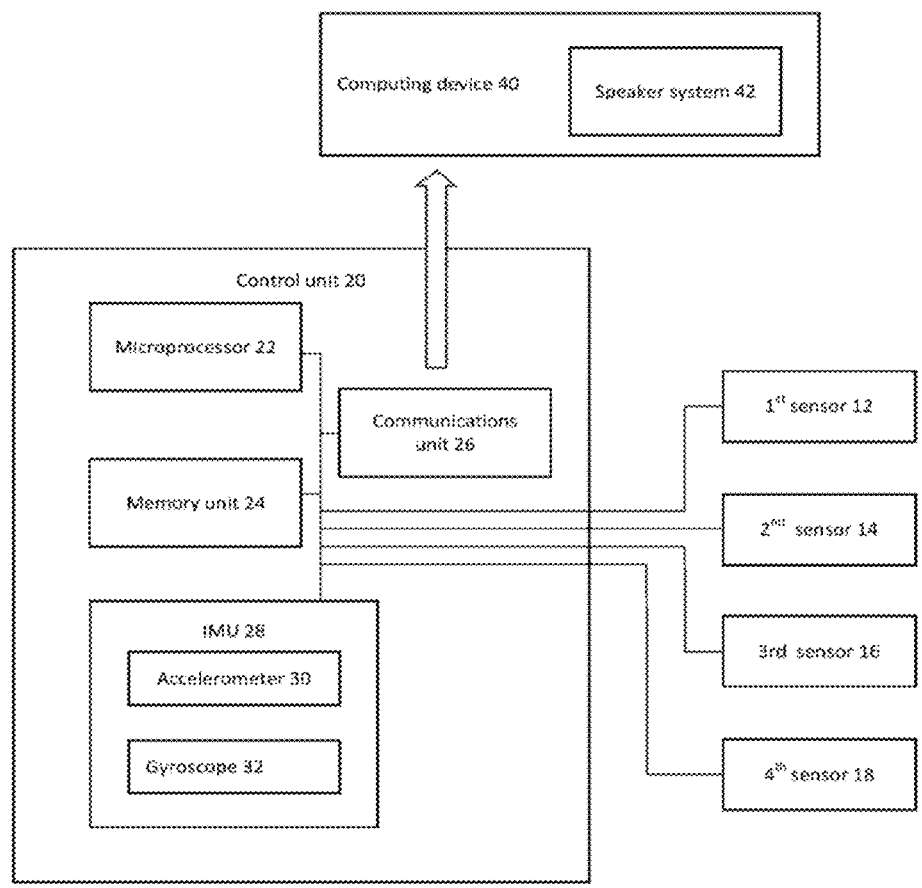
FIG. 2 shows diagrammatically elements comprised in the device.

As indicated in FIG. 2, the control unit also comprises a microprocessor unit 22, a memory unit 24, a communications unit 26, and an inertial measurement unit IMU 28, all operatively connected. Each of the first, second, third and fourth sensors 12, 14, 16, 18 is coupled to the microprocessor unit 22 to send signals to the microprocessor unit 22 each by a respective wire (not shown) embedded in the support structure 10.

The IMU 28 includes a sensor in the form of an accelerometer 30 configured to provide acceleration information indicative of linear acceleration of the wrist to the microprocessor unit 22, and another sensor in the form of a gyroscope 32, configured to provide angular information indicative of angular motion of the wrist to the microprocessor unit 22. Preferably, the IMU 28 is located on or in the support structure 10 against or near to the wrist of the user.

The memory unit 24 has a computer program comprising computer program code stored thereon, which, when executed by the microprocessor unit 22, results in the control unit 20 having the functionality ascribed to it herein. In particular, the microprocessor unit 22 is configured to receive signals from the IMU 28 and the first, second, third and fourth sensors 12, 14, 16, 18, and to process those signals to determine the gesture that has been performed. The computer program includes a first table, indicated in FIG. 3, by which the microprocessor unit 22 can determine which of the predetermined gestures has been performed based on received signals. The first table indicates that, for a particular gesture to be determined as having been performed, particular sensors have to have been triggered.

The device may also include one or more LEDs operatively coupled to the control unit 20. The one or more LEDs may be used for example to inform the user that the system is calibrated prior to use. The device also preferably includes a charging port, for example in accordance with a USB format.

The percussion system includes a computing device 40, located near the communications unit 26. The communications unit 26 is configured to send a gesture identifier to the nearby computing device 40 using a wireless communications technology, such as Bluetooth®.

Although not indicated in the Figures, the computing device 40 also comprises a processing unit, a memory unit, and a communications unit, as well as a speaker unit 42. The memory unit also has a computer program comprising computer program code stored thereon. The processing unit is configured to run the computer program code to provide the functionality ascribed to the computing device 40 herein. The communications unit is configured for communication using the wireless communications technology, so as to receive the gesture identifier from the control unit 20.

The computing device 40 may be a computer, laptop or mobile device, such as an Iphone®, in which the speaker unit 42 is integrated. The computer program code may include an application installed on the computing device 40. In variant embodiments, the computing device 40 may be operatively coupled to an external speaker unit, and configured to play the audio samples on the external speaker unit.

The computing device 40 is configured to receive the gesture identifier from the control unit 20, to determine an audio sample using the gesture identifier, and to play the audio sample using the speaker unit 42 in real-time.

In variant embodiments, the first table is stored on the computing device 40 and the control unit 20 does not determine the gesture identifier based on signals received from the sensors. Instead, the control unit 20 uses the communications unit 26 to send information indicative of received signals to the computing device 40, and the computing device 40 is configured to determine the particular gesture that was performed.

In order to determine the audio sample, the computer program code at the computing device 40 has a second table stored thereon mapping gesture identifiers with audio samples, as indicated in FIG. 4. The computer device 40 is configured to determine an audio sample identified by the gesture identifier using the second table. By way of example, audio sample A may be a kick drum, audio sample B may be a high hat, et cetera. The audio samples are not limited to sounds that might be generated using percussion instruments; they may include any kind of sound. The computer device 40 may be configured to store multiple sets of samples, and configured so that the user can choose which to select.

The audio samples may be preconfigured, that is, provided by a supplier of the software. Preferably the computing device 40 is configured to enable a user to map particular predetermined gestures to audio samples. The audio samples may be preconfigured. Alternatively, one or more audio samples may be provided by the user, and may be prerecorded by the user.

The computer program on the computing device 40 may have a sequencer mode, in which a sample can be recorded, played, and looped, for example.

The control unit 20 is configured to determine volume information indicative of relative volume at which an audio sample should be played based on amplitude of signals received from the first, second, third and fourth sensors 12, 14, 16, 18. Where a signal is received from one signal, the volume information is based on the amplitude of that received signal. When a signal is received from more than one signal simultaneously, the volume information is based on the highest amplitude of the amplitudes of the signals received.

The first table is configured to allow each gesture to be uniquely distinguished based on combinations of triggered sensors. While the gestures identified in the first table are each uniquely identifiable based on a determination of which of the first, second, third and fourth sensors 12, 14, 16, 18 have triggered, outputs of the IMU 28 may also be used to determine or confirm that a gesture has been correctly identified.

Outputs of the IMU 28 are generated as angular coordinates, indicative of angular movement about "x", "y" and "z" axes. These axes each extend through the IMU 28, which is located in a fixed location relative to the wrist of the user. Thus, the IMU 28 is configured to generate information indicative of angular movement of the wrist. The z-axis extends lengthwise with respect to a forearm of the user. The x-axis and the y-axis each extend radially with respect to the z-axis. The y-axis extends through a portion of the wrist generally orthogonal to the palm when the palm is outstretched. The x-axis extends perpendicularly thereto.

The device is configured to enable the user to set a predetermined base position for the device. The user returns his or her arm to the base position between gestures. The device is configured to generate information indicating angular movement from the base position.

The base position is set with the user holding the arm with the elbow bent at a right angle, with the forearm parallel to the ground, and fingers and hand extended and pointing away from a front of a body of the user in a forward direction from the perspective of the user. A palm of the hand is open and flat, and a plane thereof extends horizontally. With the hand and arm held in this orientation, the user operates the computing device to set the base position of the axes used by the IMU 28 and to set the current position as (0, 0, 0); the computing device 40 sends a message to the device causing the control unit 20 to set the axes and the coordinates (0,0,0) based on the current position. The z-axis is thus set as being co-axial with the length of the forearm and extended hand. The x-axis extends from right to left in front of the user. The y-axis is vertical.

The first table indicates angular parameter values associated with particular gestures as angular positions about the axes, when the gesture is performed from the base position. The parameter values are indicative of an angular movement that occurs, but in practice the device is configured with ranges for angular movement on each axes, such that where angular movements are determined to be within each of the predetermined ranges, the device can determine that the corresponding gesture has been performed. For example, the ranges may be 10 degrees either side of the indicated values.

A first gesture (chest slap) is determined when the first, third and fourth sensors 12, 14, 18 are triggered. The first gesture is determined whether or not the second sensor 16 is triggered, as it may or may not be incidentally triggered in a chest slap gesture. Also, an output from the IMU 28 indicates movement of the wrist in x, y and z directions.

A second gesture (hand clap) is determined when the third and fourth sensors 16, 18 are triggered, and when the first sensor 12 is not triggered. Like with the first gesture, the second gesture is not dependent on whether the second sensor 16 is triggered. This reflects the fact that a hand clap does not typically hit the thenar eminence portion of a palm, whereas a chest slap does. Also, an output from the IMU indicates movement in x, y and z directions.

A chest slap, which results in angular coordinates of (−30,+90,−90) when the hand strikes the chest, can be easily distinguished from a clap gesture (which has the parameter range of −60, +20, −180).

A third gesture (finger click) is determined when the first sensor 12 is triggered, and the second and fourth sensors 14, 18 are not triggered. The third gesture is not dependent on whether or not the third sensor 16 is triggered. This reflects that a finger click action, which uses the middle finger, hits the thenar eminence, and may incidentally trigger the third sensor 16. Also, an output from the IMU 28 indicates that the wrist moves in x, y and z directions.

A fourth gesture (thump) is determined when the second sensor 14 is triggered and when the first and third sensors 12, 16 are not triggered. The fourth gesture is not dependent on whether or not the fourth sensor 18 is triggered. Also, an output from the IMU 28 indicates positioning downwards in the x and left in the z direction.

Information indicative of translational movement in radial directions with respect to the x, y and z axes may also be output by the IMU 28. Such information may also be used to distinguish gestures. Alternatively, such information may be used to cause a predetermined sound effect to be produced on a sample, preferably stored using a MIDI format; for example the sample may be distorted. Different translational movements may result in different sound effects. Thus, a user can perform translational movement when performing certain gestures to cause the sound effect to be produced. The particular sound effect corresponding to a particular translational movement may be preconfigured using the device 40.

A calibration phase may be required in which the user performs each of the gestures several times and ranges for parameters are set by the communications unit. In this case the parameters may include both outputs from the IMU and speed of impact of each sensor. Alternatively, preconfigured ranges may be used.

Figure 5:
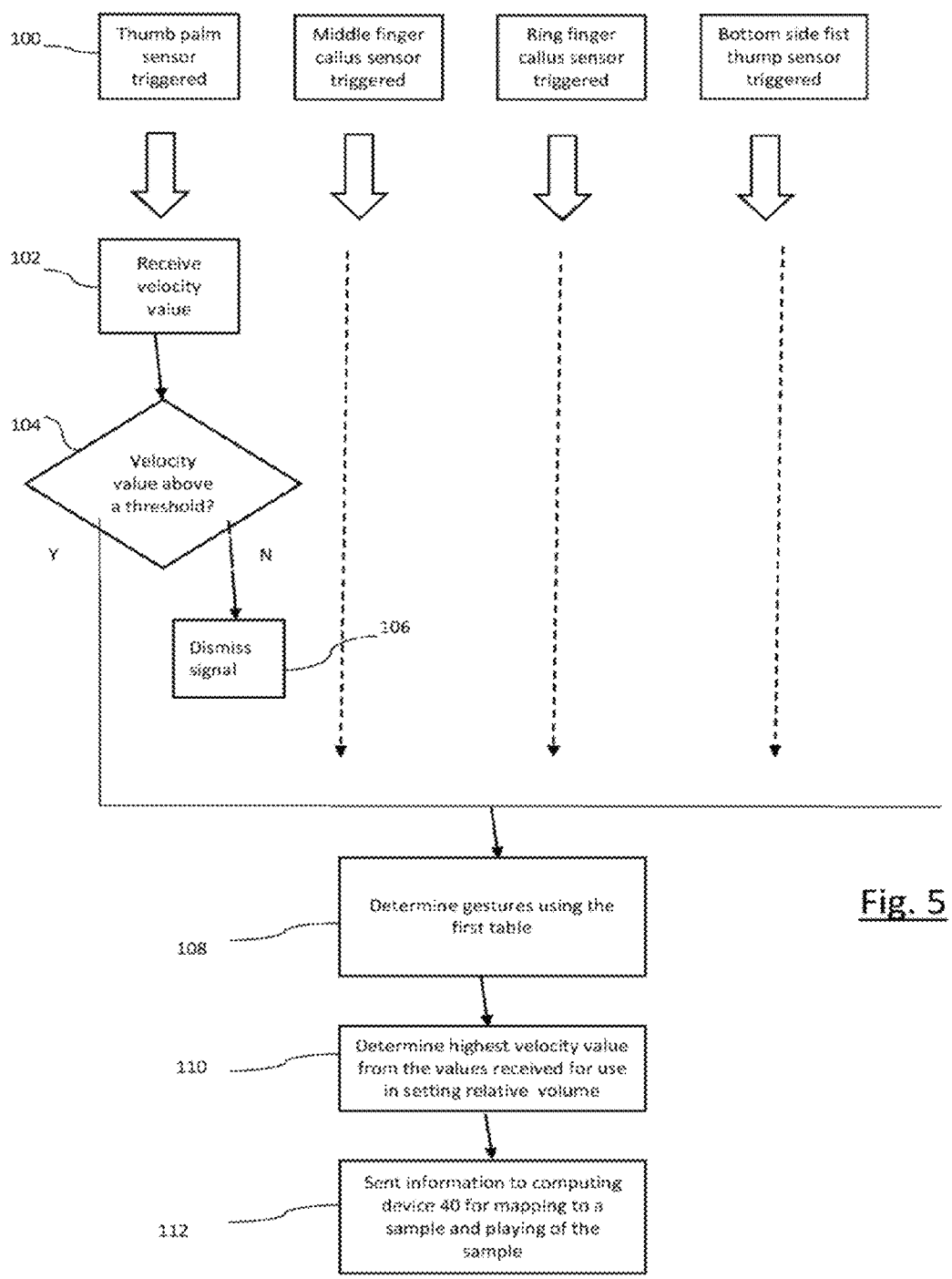
FIG. 5 is a flow chart indicating steps in accordance with embodiments of the invention that take place at the device.
Figure 6:
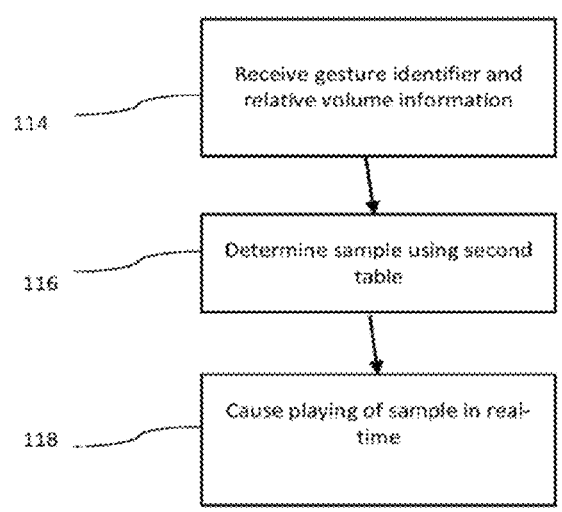
FIG. 6 is a flow chart indicating steps that occur at a computing device.

Use of the system is now described with reference to FIG. 5. First at step 100, one or more of the first, second third and fourth sensors 12, 14, 16, 18 are triggered by impact of the or each sensor on a contact surface. Each of the triggered sensors produces a signal indicative of speed of impact that is sent to the control unit 20. The control unit 20 receives the signals at step 102.

At step 104, the control unit 20 determines if the speed value is above a threshold value. If the speed value is below the threshold value, the signal is not used, as indicated at step 106. If the speed value is above the threshold value, the signal is used to determine which of the predetermined gestures the signals relate to at step 108, using the first table.

If no gesture can be determined based on the one or more signals that are used, no gesture identifier is determined and the process is stopped.

At step 110, relative volume information is determined.

At step 112, the relative volume information and the determined gesture identifier are sent to the computing device 40.

At step 114, the relative volume information and the determined gesture identifier are received by computing device 40.

At step 116, the computing device 40 uses the second table to determine a sample corresponding to the gesture identifier.

At step 118, the computing device 40 causes the sample to play using the speaker unit 42. The sample is played in real-time following completion of performance of the gesture by the user.

In variant embodiments, the control unit 20 is configured to determine other gestures, additionally or alternatively to the four gestures mentioned above.

The middle finger callus sensor 16 or the ring finger callus sensor 18 each be selectively triggered when one or more further, different gestures are performed. In variant embodiments, the middle finger callus sensor 16 or the ring finger callus sensor 18 may be absent. The four gestures mentioned above at (a) to (d) can still be distinguished. In addition or alternatively to the middle finger callus sensor 16 and/or the ring finger callus sensor 18, a sensor may be located elsewhere on the palm in a location such that it is not triggered in a finger-click action but is triggered in a chest slap or a hand clap action. In the embodiment shown, the sensors 16, 18 are located as shown due to the disposition of the strap, but other configurations of wearable device (e.g. a glove) may be provided in which a sensor is otherwise located.

The computing device 40 and the control unit 20 may be configured so that a user can configure new gestures to correspond with respective samples. This requires a training process in which:
(i) a user performs a gesture, resulting in at least one of the sensors 12, 14, 16, 18 and the IMU 28 producing outputs;
(ii) parameters for the gesture are set based on the outputs;
(iii) the first table is modified to include the parameters and an identifier identifying the gesture;
(iv) the second table is modified to map the gesture identifier to an audio sample selected by the user.

The gesture may be performed multiple times to optimise the parameters, such that ranges are set. The setting of parameters for a new gesture may be performed in a machine learning process.

The device may be used to trigger playing of samples other than by performing of gestures. For example, a hand with the device on may be gripped in certain ways to trigger certain sensors. The first mapping table may be configured to determine which such sensor grip actions are performed and to determine a corresponding identifier, by which a sample can be determined using the second mapping table. Sensors may also be triggered to cause sound effects, for example reverb.

The above described device is for use on a user's left hand. A device may be configured for user on the user's right hand. In this case, the device is configured in a mirror-image manner. The device for the user's left hand may be used together with the device for the user's right hand, or the two devices may be used separately.

The base position may be different to the base position described above. In this case, the values for angular movements are different.

The applicant hereby discloses in isolation each individual feature or step described herein and any combination of two or more such features, to the extent that such features or steps or combinations of features and/or steps are capable of being carried out based on the present specification as a whole in the light of the common general knowledge of a person skilled in the art, irrespective of whether such features or steps or combinations of features and/or steps solve any problems disclosed herein, and without limitation to the scope of the claims. The applicant indicates that aspects of the present invention may consist of any such individual feature or step or combination of features and/or steps. In view of the foregoing description it will be evident to a person skilled in the art that various modifications may be made within the scope of the invention.

The invention claimed is:

1. An electronic body percussion system for creating music, the system comprising:
a plurality of sensors;
a processor;
a sensor mount configured to attach the sensors to a hand and locate the sensors each at a respective predetermined non-finger location thereon,
wherein each of the sensors is configured to send information for receipt by the processor in response to impact of the sensor on a contact surface,
wherein the sensor mount and the sensors are together configured so that such information enables the processor to distinguish each of a plurality of predetermined body percussion gestures that can be performed by the user from each other of the predetermined body percussion gesture,
wherein different body percussion gestures can generate different sounds,
wherein the gestures include a finger clicking action, a chest slap and a hand clap, and
wherein the processor is configured to determine that one of the gestures has been performed based on the received information.

2. The electronic body percussion system of claim 1, wherein such gestures include a thumping action.

3. The electronic body percussion system of claim 2, wherein the sensor mount is configured to locate one of the sensors on a bottom side of a hand, for detecting the thumping action.

4. The electronic body percussion system of claim 1, wherein the sensors comprise a third sensor, wherein the sensor mount is configured to locate the third sensor on an upper portion of a palm of the hand, below a middle finger.

5. The electronic body percussion system of claim 1, wherein the sensors comprise a fourth sensor, wherein the sensor mount is configured to locate the fourth sensor on an upper portion of a palm of the hand, below a ring finger.

6. The electronic body percussion system of claim 1, wherein the sensor mount comprises a support wearable on the hand, wherein each of the sensors is mounted on the support, and the support is configured to locate and retain the sensors at predetermined locations on the hand.

7. The electronic body percussion system of claim 1, further comprising a movement sensing unit wherein the sensor mount is configured to attach the movement sensing unit to the user in a fixed disposition relative to a wrist of the user, wherein the movement sensing unit is configured to generate movement information in response to angular movement of the wrist relative to a predetermined initial position, wherein the processor is configured to receive the movement information, and to determine that the gesture has been performed also based on the movement information.

8. The electronic body percussion system of claim 1, wherein the movement information is indicative of angular movement of the wrist about each of three mutually perpendicular axes.

9. The electronic body percussion system of claim 1, wherein the processor is configured to determine a gesture identifier corresponding to the performed gesture using a first mapping table that maps information received from the sensors to predetermined gestures.

10. The electronic body percussion system of claim 9, wherein the processor is further configured to:
 determine a sample from a plurality of samples based on the determined gesture identifier using a second mapping table;
 cause playing of the determined sample.

11. The electronic body percussion system of claim 1, wherein the sensor mount is configured to locate a first of the sensors at a portion of a palm of the hand at which a middle finger impacts in a finger clicking action, wherein the first sensor is configured to provide a signal in response to the clicking action and the chest slap.

12. The electronic body percussion system of claim 11, wherein the sensor mount is configured to locate at least one further of the sensors at another portion of the palm to provide a signal in response to a chest slap and hand clap.

13. A method of determining a percussion gesture, for creating music, the method comprising:
 receiving, at a control, information from at least one of a plurality of sensors indicating at least that the respective sensor has hit a contact surface, wherein the sensors are each located at a predetermined location on a non-finger part of a hand;
 determining that one of a plurality of predetermined gestures has been performed, based on the received information, wherein different gestures can generate different sounds, wherein the gestures include a finger clicking action, a chest slap and a hand clap.

14. The method of claim 13, wherein such gestures include a thumping action.

15. The method of claim 13, wherein a first of the sensors is located at a portion of a palm of the hand at which a middle finger impacts in a finger clicking action, wherein the first sensor is configured to provide a signal in response to such a clicking action.

16. The method of claim 15, wherein at least one further of the sensors is located at a portion of a palm of the hand, below fingers of the hand, that is not hit in a finger clicking action.

17. The method of claim 16, wherein the first sensor and the at least one further sensor are configured for use in detecting a chest slap action.

18. The method of claim 13, further comprising:
 generating, by a movement sensing unit, angular movement information in response to angular movement of a user's wrist; and
 receiving the movement information and determining that the one gesture has been performed also based on the received movement information.

19. The method of claim 13, further comprising:
 determining a sample from a plurality of samples based on the determined gesture;
 causing playing of the determined sample.

20. An electronic body percussion system, comprising:
 a plurality of sensors;
 determining means;
 attaching means for attaching the sensors to a hand and locating the sensors each at a respective predetermined non-finger location thereon,
 wherein each of the sensors is configured to send information for receipt by the determining means in response to impact of the sensor on a contact surface,
 wherein the attaching means and the sensors are together configured so that such information enables the determining means to distinguish each of a plurality of predetermined body percussion gestures that can be performed by the user from each other of the predetermined body percussion gestures,
 wherein different body percussion gestures can generate different sounds,
 wherein the gestures include a finger clicking action, a chest slap and a hand clap, wherein the determining means is configured to determine that one of the gestures has been performed based on the received information.

* * * * *